United States Patent [19]

Shultz

[11] 4,038,233

[45] July 26, 1977

[54] AQUEOUS RESIN COMPOSITION CONTAINING POLYMERS OR COPOLYMERS OF ETHYLENICALLY UNSATURATED MONOMERS AND A WATER-SOLUBLE CATIONIC POLYELECTROLYTE POLYMER

[75] Inventor: Jay S. Shultz, Little Rock, Ark.

[73] Assignee: Johnson & Johnson, New Brunswick, N.J.

[21] Appl. No.: 595,248

[22] Filed: July 11, 1975

[51] Int. Cl.$^2$ .............................................. C08L 33/08
[52] U.S. Cl. .................. 260/29.6 RW; 260/29.6 WB; 260/29.6 HN; 260/29.7 W
[58] Field of Search ............... 260/29.7 W, 29.6 RW, 260/29.6 WB, 29.6 HN

[56] References Cited

U.S. PATENT DOCUMENTS

| | | | |
|---|---|---|---|
| 2,780,562 | 2/1957 | Reinartz et al. | 260/29.6 RW |
| 3,014,896 | 12/1961 | Colwell et al. | 260/29.6 HN |
| 3,205,187 | 9/1965 | Vanderhoff | 260/29.6 RW |
| 3,372,149 | 3/1968 | Fertig et al. | 260/78.4 |
| 3,399,159 | 8/1968 | Samour | 260/29.6 HN |
| 3,446,761 | 5/1969 | Antonelli et al. | 260/29.6 RW |
| 3,639,327 | 2/1972 | Drelich et al. | 260/29.6 N |

Primary Examiner—M. J. Welsh
Attorney, Agent, or Firm—Charles J. Metz

[57] ABSTRACT

Stable, aqueous, synthetic resin compositions comprising: (1) a synthetic resin; and (2) a high molecular weight, water-soluble, acid salt of a cationic polyelectrolyte polymer having (a) a backbone consisting essentially of carbon atoms and (b) side chains containing cationic amine groups; methods of applying such synthetic resin compositions to porous materials on which and into which their migration is controlled; and the porous materials so treated with such synthetic resin compositions.

7 Claims, No Drawings

AQUEOUS RESIN COMPOSITION CONTAINING POLYMERS OR COPOLYMERS OF ETHYLENICALLY UNSATURATED MONOMERS AND A WATER-SOLUBLE CATIONIC POLYELECTROLYTE POLYMER

The present invention relates to: improved stable, aqueous, synthetic resin compositions; methods of utilizing the same; and the resulting products. More specifically, the present invention relates to stable, aqueous, synthetic resin compositions which are intended to be applied to porous or absorbent materials such as textile materials, paper, paper products, wood, leather, polyurethane and other foams, wall board, concrete, cinder block, etc.; to methods of applying such synthetic resin compositions to such porous or absorbent materials on which or into which the extent of the migration, diffusion, penetration, or spreading of such synthetic resin compositions is controlled; and to the porous materials so treated with these synthetic resin compositions.

GENERAL BACKGROUND

In many industries such as the textile, paper, paper products, wood, leather, polyurethane foam, printing arts, decorative arts, building materials and like industries, there is often a need to apply a stable, aqueous resin composition to porous or absorbent materials and to maintain such resin composition in the same shape, size and configuration, as well as in the same location, on the porous or absorbent materials where it was originally applied without undesirably migrating, penetrating, or spreading materially therefrom in any direction to any substantial extent on or into the porous or absorbent materials.

Such resins have found use in the coating industries for the coating of woven, knitted, nonwoven and other textile fabrics, paper, paper products, and other related materials. The resins are also used as adhesives for laminating materials or for bonding fibrous webs. These resins have also found wide use as additives in the manufacture of paper, the printing industry, the decorative printing of textiles, and in other industries.

PURPOSES AND OBJECTS

It is therefore a principal purpose and object of the present invention to provide improved, stable, aqueous resin compositions which can be applied to porous or absorbent materials in such fashion as to control the extent of the migration, diffusion, penetration or spreading of the resin composition on or into the porous or absorbent materials.

STATEMENT OF THE INVENTION

It has been found that such purpose and object, as well as other purposes and other objects which will become clear from a further reading hereof, may be achieved by applying to the porous or absorbent materials a stable, aqueous synthetic resin composition comprising from about 0.1% to about 60% by weight, and preferably from about 5% to about 50% by weight, on a solids basis of a synthetic resin and from about 0.01% by weight to about 8% by weight, and preferably from about 0.25% to about 2% by weight, based on the weight of the synthetic resin, (solids/solids basis), of a high molecular weight, water-soluble, cationic polyelectrolyte polymer having (a) a backbone consisting essentially of carbon atoms and (b) side chains containing cationic amine groups.

PREFERRED ILLUSTRATIVE EMBODIMENT

The present invention will be described in greater particularity herein purely for illustrative but not limitative purposes insofar as it realtes to porous, absorbent fibrous sheet materials and to their methods of manufacture. More particularly, however, the present invention is concerned with the so-called bonded, "nonwoven" textile fabrics, i.e., fabrics produced from textile fibers without the use of conventional spinning, weaving, knitting or felting operations.

Although not limited thereto, the invention is of primary importance in connection with nonwoven fabrics derived from "oriented" or carded fibrous webs composed of textile length fibers, the major proportion of which are oriented predominantly in one direction Another aspect of the present invention is its application to nonwoven fabrics wherein the textile-length fibers were originally predominantly oriented in one direction but have been reorganized and rearranged in predetermined designs and patterns of fabric openings and fiber bundles.

Still another aspect of the present invention is its application to nonwoven fabrics wherein the textile-length fibers are disposed at random by air-laying techniques and are not predominantly oriented in any one direction. Typical nonwoven fabrics made by such procedures are termed "isotropic" nonwoven fabrics.

And still another aspect of the present invention is its application to nonwoven fabrics which comprise wood pulp fibers and/or textile-length fibers and which are made basically by conventional or modified aqueous paper making techniques. Such fabrics are also basically isotropic and generally have like properties in all directions.

The conventional base starting material for the majority of these nonwoven fabrics is usually a fibrous web comprising any of the common textile-length fibers, or mixtures thereof, the fibers varying in average length from approximately one-half inch to about 2 inches. Exemplary of such fibers are the natural fibers such as cotton and wool and the synthetic or man-made cellulosic fibers, notably rayon or regenerated cellulose.

Other textile length fibers of a synthetic or man-made origin may be used in various proportions to replace either partially or perhaps even entirely the previously named fibers. Such other fibers include: polyamide fibers such as nylon 6, nylon 66, nylon 610, etc.; polyester fibers such as "Dacron", "Fortrel" and "Kodel"; acrylic fibers such as "Acrilan", "Orlon" and "Creslan"; modacrylic fibers such as "Verel" and "Dynel"; polyolefinic fibers derived from polyethylene and polypropylene; cellulose ester fibers such as "Arnel" and "Acele"; polyvinyl alcohol fibers; etc.

These textile length fibers may be replaced either partially or entirely by fibers having an average length of less than about one-half inch and down to about one-quarter inch. These fibers, or mixtures thereof, are customarily processed through any suitable textile machinery (e.g., a conventional cotton card, a "Rando-Webber", a paper making machine, or other fibrous web producing apparatus) to form a web or sheet of loosely associated fibers, weighing from about 100 grains to about 2,000 grains per square yard or even higher.

If desired, even shorter fibers, such as wood pulp fibers or cotton linters, may be used in varying proportions, even up to 100%, where such shorter length fibers can be handled and processed by available apparatus. Such shorter fibers have lengths less than one-fourth inch.

The resulting fibrous web or sheet, regardless of its method of production, is then subjected to at least one of several types of bonding operations to anchor the individual fibers together to form a self-sustaining web. One method is to impregnate the fibrous web over its entire surface area with various well-known bonding agents, such as natural or synthetic resins. Such over-all impregnation produces a nonwoven fabric of good longitudinal and cross strength, acceptable durability and washability, and satisfactory abrasion resistance. However, the nonwoven fabric tends to be somewhat stiff and boardlike, possessing more of the properties and characteristics of paper or board than those of woven or knitted textile fabric. Consequently, although such over-all impregnated nonwoven fabrics are satisfactory for many uses, they are still basically unsatisfactory as general purpose textile fabrics.

Another well-known bonding method is to print the fibrous webs with intermittent or continuous straight or wavy lines, or areas of binder extending generally transversely or diagonally across the web and additionally, if desired, alng the fibrous web. The resulting nonwoven fabric is far more satisfactory as a textile fabric than over-all impregnated webs in that the softness, drape and hand of the resulting nonwoven fabric more nearly approach those of a woven or knitted textile fabric.

The printing of the resin binder on these nonwoven webs is usually in the form of relatively narrow lines, or elongated rectangular, triangular or square areas, or annular, circular, or elliptical binder areas which are spaced apart a predetermined distance which, at its maximum, is preferably slightly less than the average fiber length of the fibers constituting the web. This is based on the theory that the individual fibers of the fibrous web should be bound together in as few places as possible.

These resin colloidal dispersions, or resins emulsions, or latexes, may be anionic, non-ionic or even polyionic, and stable dispersions are available commercially at pH's of from about $2\frac{1}{2}$ to about 10, and preferably from about $3\frac{1}{2}$ to about 7, and these ae the pH ranges of the application of the present invention concept.

Lower pH ranges are preferred commercially and such are more conductive to better efficiency and improved operation. Such lower pH ranges are preferred where their acidic effects can be tolerated by the equipment and apparatus being used. To avoid excess wear and tear on equipment and apparatus, however, pH ranges of about 7 or slightly on the alkaline side are commercially preferred.

The amount of resin which is applied to the porous or absorbent material varies within relatively wide limits, depending upon the resin itself, the nature and character of the porous or absorbent material to which the resins are being applied, its intended use, etc. A general range of from about 4% by weight up to about 50% by weight, based on the weight of the porous or absorbent material, is satisfactory under substantially all uses. Within the more commerical limits, however, a range of from about 10% to about 30% by weight, based on the weight of the porous or absorbent materials, is preferred.

The nominal surface coverage of such binder lines or areas will vary widely depending upon the precise properties and characteristics of softness, drape, hand and strength which are desired in the final bonded product. In practice, the nominal surface converage can be designed so that it falls within the range of from about 10% to about 50% of the total surface of the final product. Within the more commercial aspects of the present invention, however, nominal surface coverages of from about 12% to about 40% are preferable.

In certain cases, especially where larger proportions of short fibers are used, surface coverages of up to about 85% are often encountered and such are preferred in some applications of the present invention.

Such bonding increases the strength of the nonwoven fabric and retains substantially complete freedom of movement for the individual fibers whereby the desirable softness, drape and hand are obtained. This spacing of the binder lines and areas has been accepted by the industry and it has been deemed necessarily so, if the stiff and board-like appearance, drape and hand of the over-all impregnated nonwoven fabrics are to be avoided.

The nonwoven fabrics bonded with such line and area binder patterns have had the desired softness, drape and hand and have not been undesirably stiff or board-like. However, such nonwoven fabrics have alslo possessed some disadvantages.

For example, the relatively narrow binder lines and relatively small binder areas of the applicator (usually an engraved print roll) which are laid down on the fibrous web possess specified physical dimensions and inter-spatial relationships as they are initially laid down. Unfortunately, after the binder is laid down on the wet fibrous web and before it hardens or becomes fixed in position, it tends to spread, diffuse or migrate whereby its physical dimensions are increased and its inter-spatial relationships decreased. And, at the same time, the biner concentration in the binder area is lowered and rendered less uniform by the migration of the binder into adjacent fibrous areas. One of the results of such migration is to make the surface coverage of the binder areas increase whereby the effect of the intermittent bonding approaches the effect of the over-all bonding. As a result, some of the desired softness, drape and hand are lost and some of the undesired properties of harshness, stiffness and boardiness are increased.

It is therefore desirable that the narrow binder lines remain narrow and that they do not migrate into wide binder lines. As pointed out previously, such desirable features are provided by the use of the resin compositions of the present invention.

As pointed out previously, the resin composition which is applied to the porous or absorbent materials comprises: (1) a synthetic resin and (2) a high molecular weight, water-soluble, cationic polyelectrolyte polymer as a migration control agent.

THE SYNTHETIC RESINS

The synthetic resins may be selected from a relatively large group of synthetic resins well known in industry for bonding, coating, impregnating or related uses, and may be of a self cross-linking type, externally cross-linking type, or not cross-linked. Specific examples of such synthetic resins include: polymers andcopolymers of vinyl ethers; vinyl halides such as plasticized and unplasticized polyvinyl chloride, polyvinyl chloride-polyvinyl acetate, ethylene-vinyl chloride, etc.; polymers and copolymers of vinyl esters such as plasticized and unplasticized polyvinyl acetate, ethylene-vinyl acetate, acrylic-vinyl acetate, etc.; polymers and copolymers of the polyacrylic resins such as ethyl acrylate, methyl acrylate, butyl acrylate, ethylbutyl acrylate, ethyl hexyl acrylate, hydroxyethyl acrylate, dimethyl amino ethyl acrylate etc.; polymers and copolymers of the polymethacrylic resins such as methyl methacrylate, ethyl methacrylate, isopropyl methacrylate, butyl methacrylate, etc.; polymers and copolymers of acrylonitrile, methacrylonitrile, acrylamide, N-isopropyl acrylamide, N-methylol acrylamide, methacrylamide, etc.; vinylidene polymers and copolymers, such as polyvinylidene chloride, polyvinylidene chloridevinyl chloride, polyvinylidene chloride-ethyl acrylate, polyvinylidene chloride-vinyl chloride-acrylonitrile, etc.; polymers and copolymers of polyolefinic resins including polyethylene, polypropylene, ethylene-vinyl chloride and ethylene-vinyl acetate which have been listed previously; the synthetic rubbers such as, poly(1,3-butadiene), poly(2-ethyl-1,3-butadiene), high, medium and carboxylated poly(butadiene-acrylonitrile),poly(butadiene-styrene, chlorinated rubber, etc., the polyurethanes; the polyamides; the polyesters; the polymers and copolymers of the styrenes including; styrene, 2-methyl styrene, 3-methyl styrene, 4-methyl styrene, 4-ethyl styrene, 4-butyl styrene; phenolic emulsions; etc.

These resins may be used either as homopolymers comprising a single repeating monomer unit, or they may be used as copolymers comprising two, three, or more different monomer units which are arranged in random fashion, or in a definite order alternating fashion, within the polymer chain. Also included within the inventive concept are the block polymers comprising relatively long blocks of different monomer units in a polymer chain and graft polymers comprising chains of one monomer attached to the backbone of another polymer chain. One large group of synthetic resins which have proven satisfactory and which are preferably used is the group consisting of polymers and copolymers of ethylenically unsaturated monomers.

In selecting the resin dispersion to be incorporated in the new composition it is preferred that the dispersion be anionically stabilized. An anionically stabilized dispersion is used in the context of this invention as being a dispersion having a negative Zeta potential. There are instances when the dispersions may be non-ionic, but it cannot be cationically stabilized, i.e., have a Zeta potential on the positive side. The reason for the resin dispersion being nonionic or having a negative Zeta potential will be discussed more fully hereinafter.

THE MIGRATION CONTROL AGENT

To the aqueous dispersion of synthetic resin solids is added a small amount of from about 0.1% by weight to about 8% by weight, based on the weight of the synthetic resin, of a migration control agent comprising a high molecular weight, water-soluble, cationic polyelectrolyte polymer having (1) a backbone consisting essentially of carbon atoms and (2) also containing side chains with cationic amine groups.

One very large class of polymers falling within this genus may be represented by the following structural formula:

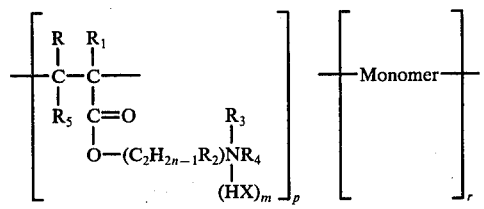

wherein:
R and $R_1$ are hydrogen, methyl, or ethyl;
$R_2$ and $R_3$ and $R_4$ and $R_6$ are hydrogen or alkyl from 1 to 4 carbon atoms;
$R_5$ is hydrogen, $-COOR_6$, or $-COO(C_nH_{2n-1}R_2)NR_3R_4$;
$m$ is a small number from 1/3 to 2;
$n$ is a small whole number from 2 to 4;
$x$ is nitrate, chloride, bromide, iodide, phosphate, formate, propionate, citrate, butyrate, sulfate, acetate, or an acidic anionic group derived from an organic or inorganic acid;
$p$ and $r$ are the percentages of the two reacting monomers, in which $p + r = 100\%$ and $p$ is at least about 50 mole percent and $r$ is less than about 50 mole percent down to 0 mole percent; and "Monomer" is acrylamide, diacetone acrylamide, t-butyl acrylamide, methacrylamide, methyl vinyl ether, ethyl vinyl ether, lower alkyl esters of acrylic and methacrylic acids, hydroxyethyl acrylate, hydroxyethyl methacrylate, hydroxypropyl acrylate, hydroxymethyl methacrylate, vinyl acetate, vinyl chloride, ethylene, and other monomers capable of copolymerizing with the aminoalkylated monomer on the left hand side in the structural formula to form copolymers therewith.

The molecular weight of the water-soluble, cationic polyelectrolyte polymer will vary over a relatively wide range and may be as low as about 20,000 or may be as high as one million, or even higher, as desired or required.

Salt formation is preferable, as indicated, and treatment with the desired organic or inorganic acid will yield the desired salt. As noted above, the desired salts include nitrate, chloride, bromide, iodide, phosphate, formate, propionate, citrate, butyrate, sulfate, acetate, or other salts.

The water-soluble cationic polyelectroltye polymer is prepared by methods known in the art and reference is incorporated herein to U.S. Pat. No. 3,372,149 which discloses preferred methods of preparing some of the polymers of the present invention. It is to be appreciated that, although this patent prefers the use of primary or secondary alkyleneimines and particularly ethyleneimine, propyleneimine, butyleneimine, etc., or N-methyl ethyleneimine, N-ethyl ethyleneimine, N-hydroxyethyl ethyleneimine, etc., in the aminoalkylation reaction, the use of polyfunctional aminoalcohols is also possible.

For example, the monomeric unit on the left hand side of the structural formula may be derived by reacting acrylic acid, methacrylacid, or other ethylenically unsaturated carboxylic acid including itaconic acid, ethacrylic acid, maleic acid, etc., with suitable polyfunctional amino alcohols such as:
2-amino-ethanol
2-butylamino-ethanol
2-diethylamino-ethanol 2-dimethylamino-ethanol
2-ethylamino-ethanol
2-isobutylamino-ethanol
2-isopropylamino-ethanol
2-methylamino-ethanol
2-amino-1-propanol
3-amino-1-propanol
1-amino-2-propanol
1-amino-3(diethylamino)-2-propanol
2-amino-2-methyl-1-propanol
1,3-diamino-2-propanol
1(diethylamino)-2-propanol
2-amino-1-butanol
3-amino-1-butanol
4-amino-1-butanol
3-amino-2-butanol
1-amino-2-methyl-2-pentanol The momomeric unit on the right hand side of the structural formula is the monomeric unit derived from acrylamide, diacetone acrylamide, t-butyl acrylamide, methacrylamide, methyl vinyl ether, ethyl vinyl ether, lower alkyl esters of acrylic and methacrylic acids, hydroxyethyl acrylate, hydroxyethyl methacrylate, hydroxypropyl acrylate, vinyl acetate, vinyl chloride, ethylene and other ethylenically unsaturated monomers mentioned herein capable of co-polymerizing with the aminoalkylated monomers on the left hand side of the structural formula to form copolymers therewith.

The monomeric unit on the right hand side of the structural formula may be also derived in other ways such as, for example, by reacting acrylic acid or methacrylic acid or other ethylenically unsaturated carboxylic acid as described previously with (1) a polyfunctional compound such as the amino alcohols listed previously, or with (2) an epoxy compound. Examples of suitable epoxy compounds are:

epoxyethane (ethylene oxide)
1,2-epoxy propane (propylene oxide)
1,2-epoxy butane (butylene oxide)
2,3-epoxy butane
2,3-epoxy-propanol (glycidol)

When the cationic polymer is added to the preferably anionically stabilized synthetic resin dispersion, the two tend to negate each other as concerns the combined Zeta potential of the mixed composition. Basically, then, the addition of the cationic material produces a destabilizing influence on the anionic resin dispersion, i.e., the Zeta potentials of each ingredient, being opposite, tend to render the composition more neutral. It is at the Zeta potential of zero which instability of the composition occurs. When the composition of this invention become unstable, thickening and coagulation of the resin occurs thereby providing the migration control features.

The proportion of ingredients is significant concerning the Zeta potential of the mixed composition. Upon adding the cationic, although that ingredient influences the composition towards instability, complete instability cannot be achieved before the composition is applied to the porous materials. This premature instability would thicken the composition before application to the porous product, which result is undesirable and unacceptable.

Desirably, the added portion of cationic polymer urges the Zeta potential towards zero, but leaves the mixed composition with a slightly positive or cationic Zeta potential. This mixed condition of the composition is still in a state of stability because the Zeta potential is sufficiently cationic to defeat premature coagulation. It is the stabilized, slightly cationic composition which is applied to the porous materials.

Most porous materials, such as nonwoven fabrics, have a slightly anionic or negative Zeta potential. When the slightly cationic resin composition is applied to the slightly anionic porous materials, there is just enough confluence to produce a zero Zeta potential, thereby producing instability with concurrent coagulation, thickening and migration control of the resin composition. It is this mechanism by which the new composition produces the beneficial results of resin binder migration control.

The invention will be further illustrated in greater detail by the following specific examples. It should be understood, however, that although these examples may describe in particular detail some of the more specific features of the invention, they are given primarily for purpose of illustration and the invention in its broader aspects is not to be construed as limited thereto.

EXAPLE I

A wet formed nonwoven fibrous structure is prepared from a pulp slurry comprising 40 parts by weight of hardwood sulfite wood pulp fibers, 32 parts by weight of rayon fibers (1.5 denier and one-fourth inch in length), and 8 parts by weight of polyamide nylon (6/6 fibers (6 denier and three-fourth inch in length).

The fibrous structure is bonded with a double diagonal diamond intermittent print pattern (see FIG. 3 of U.S. Pat. No. 2,705,498) wherein there are five lines per inch in each direction with each line measuring 0.020 inch in width, as measured on the binder applying engraved roll.

The resin binder formulation has a solids content of 39.5%, a pH of 5.1, a viscosity of 130 cps., and comprises;

|  | Pounds |
|---|---|
| Self cross linking polyethyl acrylate copolymer (45% aqueous) | 3368 |
| 2-aminoethyl acrylate-2-hydroxy-propyl acrylate copolymer (nitrate salt) 18% aqueous | 58 |
| Water | 459 |
| Cross-linking catalyst (20%) | 40 |
| Anti-foam agent | 8 |
| Opacifier (67%) | 67 |

The final weight of the dried nonwoven fabric is 385 grains per square yard and its final composition is 80 parts by weight of fibers and 20 parts by weight of binder. The product is quite limp and soft and demonstrates good hand and drape. Migration of the binder on or into the nonwoven fabric is determined to be minimal. Migration control over the binder is excellent. It is well suited for commercial use where its properties and its excellent absorbency are desired as in covers or facing materials for absorbent sanitary, surgical, and medical uses.

EXAMPLE II

The procedures of Example I are followed substantially as set forth therein with the exception that the percentages of the fiber mix are changed to 32.2 parts by weight of hardwood sulfite wood pulp fibers, 25.8 parts by weight of rayon fibers (1.5 denier and one-fourth inch in length), and 6.4 parts by weight of polyamide nylon 6/6 fibers (6 denier and three-fourth inch in length) and the print pattern binder add-on is changed to 16.1 parts by weight.

The product is quite limp and soft and demonstrates good hand and drape. Migration of the binder on or into the nonwoven fabric is determined to be minimal. Migration control over the intermittently spaced binder is considered excellent.

The bonded nonwoven fabric is then over-saturated in a 19.2% solids aqueous saturation bath with 19.5 parts by weight of flame retardant salts, an anti-foam agent, and glycerine. The final weight of the product is 483 grains per square yard and it successfully passes the 45° Flame Retardancy edge ignition test. It is well suited for commercial use as a pillowcase.

EXAMPLE III

The procedures of Example I are followed substantially as set forth therein with the exception that the 2-aminoethyl acrylate-2-hydroxypropyl acrylate copolymer is replaced by "Lufax", a phosphate salt of a complex, high molecular weight cationic polyelectrolyte polyamine having a molecular weight in excess of 20,000 and (a) a backbone consisting essentially of carbon atoms and (b) side chains with cationic amine groups.

The results are generally comparable to those obtained in Example I. The final product is quite limp and soft and demonstrates good hand and drape. Migration of the binder on or into the product is minimal. Migration control is considered excellent.

EXAMPLE IV

The procedures of Example III are followed substantially as set forth therein with the exception that the Lufax has a molecular weight in excess of 1 million.

The results are generally comparable to those obtained in Example I. The final product is quite limp and soft and demonstrates good hand and drape. Migration of the binder on or into the product is minimal. Migration control is considered excellent.

EXAMPLE IV(a)

The procedures of Example III are followed substantially as set forth therein with the exception that Rohm and Haas S-243, a cationic water-soluble, polymeric quaternary chloride, is used. The results are comparable.

EXAMPLE V

The procedures of Example I are followed substantially as set forth therein with the exception that the 2-aminoethyl acrylate-2-hydroxypropyl acrylate copolymer is replaced by a copolymer of N-diethyl-2-aminoethyl acrylate and 2-hydroxypropyl acrylate.

The results are generally comparable to those obtained in Example I. The final product is quite limp and soft and demonstrates good hand and drape. Migration of the binder on or into the product is minimal. Migration control is considered excellent.

EXAMPLE VI

The procedures of Example I are followed substantially as set forth therein with the exception that the 2-aminoethyl acrylate-2-hyroxypropyl acrylate copolymer is replaced by a copolymer of N-dimethyl-2-aminoethyl acrylate and 2-hydroxypropyl acrylate.

The results are generally comparable to those obtained in Example I. The final product is quite limp and soft and demonstrates good hand and drape. Migration of the binder on or into the product is minimal. Migration control is considered excellent.

EXAMPLE VII

The procedures of Example I are followed substantially as set forth therein with the exception that the 2-aminoethyl acrylate-2-hydroxypropyl acrylate copolymer is replaced by N-ethyl-2-aminoethyl acrylate.

The results are generally comparable to those obtained in Example I. The final product is quite limp and soft and demonstrates good hand and drape. Migration of the binder on or into the product is minimal. Migration control is considered excellent.

EXAMPLE VIII

A fibrous card web weighing about 570 grains per square yard and comprising 100% rayon fibers 1½ denier and 1¼ inches in length is intermittently print pattern bonded by the rotogravure process using a binder applying roll engraved with 6 horizontal wavy lines per inch, each line being 0.024 inch. The binder composition comprises a self cross-linking polyethylacrylate and a copolymer of 2-aminoethyl acrylate and 2-hydroxypropyl acrylate. The total finished weight of the bonded nonwoven fabric 690 grains per square yard which represents a binder add-on of 120 grains per square yard or 17.4% by weight. The bonded nonwoven fabric has excellent softness, drape and hand. Migration of the binder on or into the fabric is determined to be minimal.

EXAMPLE IX

The procedure of Example I are followed substantially as set forth therein with the exception that the self crosslinking polyethyl acrylate copolymer is replaced by a copolymer of ethylene and vinyl acetate.

The results are generally comparable to those obtained in Example I. The final product is quite limp and soft and demonstrates good hand and drape. Migration of the binder on or into the product is minimal. Migration control is considered excellent.

EXAMPLE X

The procedure of Example I are followed substantially as set forth therein with the exception that the self crosslinking polyethyl acrylate copolymer is replaced by a copolymer of ethylene and vinyl chloride.

The results are generally comparable to those obtained in Example I. The final product is quite limp and soft and demonstrates good hand and drape. Migration of the binder on or into the product is minimal. Migration control is considered very good,

EXAMPLE XI

The procedure of Example I are followed substantially as set forth therein with the exception that the self crosslinking polyethyl acrylate copolymer is replaced by polyvinyl chloride.

The results are generally comparable to those obtained in Example I. The final product is quite limp and soft and demonstrates good hand and drape. Migration of the binder on or into the product is low. Migration control is considered good.

EXAMPLE XII

The procedure of Example I are followed substantially as set forth therein with the exception that the self crosslinking polyethyl acrylate copolymer is replaced by polyvinyl acetate.

The results are generally comparable to those obtained in Example I. The final product is quite limp and soft and demonstrates good hand and drape. Migration of the binder on or into the product is low. Migration control is considered good.

EXAMPLE XIII

The procedure of Example I are followed substantially as set forth therein with the exception that the self crosslinking polyethyl acrylate copolymer is replaced by a copolymer of butadiene and styrene.

The results are generally comparable to those obtained in Example I. The final product is quite limp and soft and demonstrates good hand and drape. Migration of the binder on or into the product is minimal. Migration control is considered very good.

EXAMPLE XIV

The procedure of Example I are followed substantially as set forth therein with the exception that the self crosslinking polyethyl acrylate copolymer is replaced by a copolymer of butadiene, styrene and a low percentage of an $\alpha,\beta$-unsaturated lower alkyl aliphatic acid.

The results are generally comparable to those obtained in Example I. The final product is quite limp and soft and demonstrates good hand and drape. Migration of the binder on or into the product is minimal. Migration control is considered very good.

EXAMPLE XV

The following chart shows the results of additional tests run on the migration control exercised over various polymers at various concentrations of 2-aminoethyl acrylate-2-hydroxypropyl acrylate copolymer (nitrate salt):

|  | 0% (Control) | 1/2% | 1% |
|---|---|---|---|
| Polyethylacrylate | Poor | Very Good | Excellent |
| Ethylene-vinyl acetate | Poor | Very Good | Very Good |
| Ethylene-vinyl chloride | Poor | Good | Very Good |
| Polyvinyl chloride | Very Poor | Fair | Fair |
| Polyvinyl acetate | Very Poor | Fair | Fair |
| Butadiene-styrene (carboxylated) | Poor | Good | Good |
| Vinyl acetate-acrylic ester | Poor | Good | Good |
| Vinyl acetate-ethyl acrylate | Poor | Good | Good |

EXAMPLE XVI

The procedure of Example I are followed substantially as set forth therein with the exception that the nitrate salt is not prepared but is replaced by the following salts:
 a. hydrochloride salt;
 b. dihydrogen phosphate salt;
 c. sulfate salt;
 d. formate salt; and the
 e. acetate salt The results are generally comparable to the results obtained in Example I. Migration control is satisfactory.

EXAMPLE XVII

The procedures of Example I are followed subtantially as set forth therein with the exception that the nitrate salt of 2-aminoethyl acrylate/2-hydroxypropyl acrylate is replaced by the:
 a. hydrochloride salt of poly(aminoethyl acrylate-acrylamide);
 b. hydrochloride salt of poly(2-aminopropyl acrylate);
 c. hydrochloride salt of poly(aminoethyl methacrylate);
 d. hydrochloride salt of poly(aminoethyl acrylate-ethyl acrylate);
 e. dihydrogen phosphate salt of poly(aminoethyl acrylate);
 f. nitrate salt of poly(aminoethyl acrylate);
 g. sulfate salt of poly(aminoethyl acrylate);
 h. formate salt of poly(aminoethyl acrylate);
 i. acetate salt of poly(aminoethyl acrylate); and
 j. hydrochloride salt of poly(di[aminoethyl]maleate-methyl vinyl ether).

The reslts are generally comparable to the results obtained in Example I. Migration is satisfactory.

Although the present invention has been described and illustrated with reference to preferred embodiments thereof, it is to be appreciated that such is merely for the purpose of disclosing the invention and is not to be construed as limitative of the broader aspects of the inventive concept, except as defined by the appended claims.

What is claimed is:

1. An aqueous resin composition capable of being applied to porous materials under conditions of controlled migration thereon or penetration thereinto comprising:
 1. 0.1 to 60% by weight on a solids basis of an anionically or non-ionically stabilized aqueous dispersion of synthetic resin solids selected from the group consisting of polymers and copolymers of ethylenically unsaturated monomers; and
 2. 0.01 to 8% by weight, based on the weight of the synthetic resin of a water-soluble, cationic polyelectrolyte polymer having a molecular weight of at least 20,000 and having
   a. a backbone consisting essentially of carbon atoms and
   b. side chains containing amine groups, said mixture of synthetic resin solids and cationic polyelectrolyte polymer being stable and having a zeta potential which is slightly cationic, whereby when applied to porous materials having a slightly anionic zeta potential, the zeta potential of said composition approaches or reaches zero thereby destabilizing the composition and coagulating and thickening the same.

2. A synthetic resin composition as defined in claim 1 wherein the water-soluble cationic polyelectrolyte polymer has a molecular weight in excess of 1 million.

3. A synthetic resin composition as defined in claim 1 wherein the amine groups in the side chains are primarily primary amine groups.

4. A synthetic resin composition as defined in claim 1 wherein the high molecular weight, water-soluble, cationic polyelectrolyte polymer has the following structural formula:

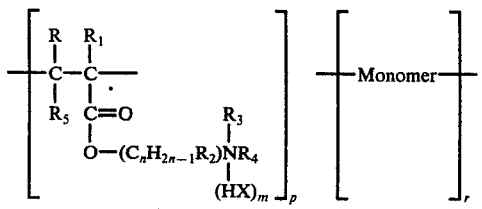

wherein:
R and $R_1$ are hydrogen, methyl, or ethyl;
$R_2$ and $R_3$ and $R_4$ and $R_6$ are hydrogen or alkyl from 1 to 4 carbon atoms;
$R_5$ is hydrogen, —$COOR_6$ or —$COO(C_nH_{2n]1}R_2)NR_3R_4$;
m is a number from ⅓ to 2;
n is a number from 2 to 4;
X is nitrate, chloride, bromide, iodide, phosphate, formate, propionate, citrate, butyrate, sulfate, acetate, or an acidic anionic group derived from an organic or inorganic acid;
p and r are the percentages of the two reacting monomers, in which $p + r = 100\%$ and p is at least about 50 mole percent and r is less than about 50 mole percent down to 0 mole percent; and "Monomer" is derived from acrylamide, diacetone acrylamide, t-butyl acrylamide, methacrylamide, methyl vinyl ether, ethyl vinyl ether, lower alkyl esters of acrylic and methacrylic acids, hydroxyethyl acrylate, hydroxyethyl methacrylate, hydroxypropyl acrylate, hydroxymethyl methacrylate, vinyl acetate, vinyl chloride, ethylene, and other monomers capable of co-polymerizing with the aminoalkylated monomer on the left hand side in the structural formula to form copolymers therewith.

5. A synthetic resin composition as defined in claim 1 wherein the high molecular weight, water-soluble, cationic polyelectrolyte polymer is a salt of the copolymer of 2-aminoethyl acrylate and 2-hydroxypropyl acrylate.

6. A synthetic resin composition as defined in claim 1 wherein the high molecular weight, water-soluble cationic polyelectrolyte polymer is a salt of the copolymer of N-diethyl-2 aminoethyl acrylate and 2-hydroxypropyl acrylate.

7. A synthetic resin composition as defined in claim 1, wherein the zeta potential of said mixture is sufficiently cationic so that when applied to nonwoven fabrics said composition destabilizes and coagulates and thickens thereon.

* * * * *

UNITED STATES PATENT AND TRADEMARK OFFICE
CERTIFICATE OF CORRECTION

PATENT NO. : 4,038,233
DATED : July 26, 1977
INVENTOR(S) : Jay S. Shultz

It is certified that error appears in the above—identified patent and that said Letters Patent are hereby corrected as shown below:

In Column 2, line 37, reads isotropic should read ---"isotropic"---.

In Column 2, line 43, reads "from approximately one-half inch to about 2 inches" should read --- from approximately one-half inch to about two and one-half inches ---.

In Column 3, line 28, reads "alng" should read --- along ---.

In Column 3, line 48, reads "invention" should read --- inventive ---.

In Column 4, line 38, reads "biner" should read --- binder ---.

In Column 4, line 65, reads "polymers andcopolymers of" should read --- polymers and copolymers of ---.

In Column 5, line 24, reads "(butadiene-styrene, chlorinated rubber, etc.", should read --- (butadiene-styrene), chlorinated rubber, etc., ---.

In Column 9, line 35, reads Lufax should read --- "Lufax" ---.

UNITED STATES PATENT AND TRADEMARK OFFICE
CERTIFICATE OF CORRECTION

PATENT NO. : 4,038,233
DATED : July 26, 1977
INVENTOR(S) : Jay S. Shultz

It is certified that error appears in the above-identified patent and that said Letters Patent are hereby corrected as shown below:

In Column 12, line 25, reads "Migration is satisfactroy" should read --- Migration control is satisfactory.

In Column 13, line 17, reads "$COO(C_nH_{2n}]_1R_2)NR_3R_4$;" should read --- $COO(C_nH_{2n-1}R_2)NR_3R_4$; --- .

Signed and Sealed this

Eighth Day of November 1977

[SEAL]

Attest:

RUTH C. MASON
Attesting Officer

LUTRELLE F. PARKER
Acting Commissioner of Patents and Trademarks